(12) United States Patent
Henty

(10) Patent No.: US 7,319,990 B1
(45) Date of Patent: *Jan. 15, 2008

(54) PRODUCE IDENTIFICATION AND PRICING SYSTEM FOR CHECKOUTS

(76) Inventor: David L. Henty, 19900 MacArthur Blvd., Suite 1150, Irvine, CA (US) 92612

( * ) Notice: Subject to any disclaimer, the term of this patent is extended or adjusted under 35 U.S.C. 154(b) by 1143 days.

This patent is subject to a terminal disclaimer.

(21) Appl. No.: 10/105,756

(22) Filed: Mar. 25, 2002

Related U.S. Application Data

(63) Continuation-in-part of application No. 09/143,903, filed on Aug. 31, 1998, now Pat. No. 6,363,366.

(51) Int. Cl.
*G06F 17/00* (2006.01)
*G06G 7/00* (2006.01)

(52) U.S. Cl. ............... 705/400; 356/326; 356/328

(58) Field of Classification Search ......... 705/400; 356/326, 328
See application file for complete search history.

(56) References Cited

U.S. PATENT DOCUMENTS

| | | | | |
|---|---|---|---|---|
| 5,339,963 A | * | 8/1994 | Tao | 209/581 |
| 5,426,282 A | * | 6/1995 | Humble | 235/383 |
| 5,867,265 A | * | 2/1999 | Thomas | 356/328 |
| 6,069,696 A | * | 5/2000 | McQueen et al. | 356/326 |
| 6,075,594 A | * | 6/2000 | Thomas et al. | 356/328 |
| 6,424,745 B1 | * | 7/2002 | Hansen et al. | 382/191 |

FOREIGN PATENT DOCUMENTS

DE   40 05 081   *   8/1991

OTHER PUBLICATIONS

Anoymous, Self-checkout systems add 'On-line' efficiency, Jun. 1998; Discount Store News, v37, n11, p70+; proquest copy pp. 1-2.*

"Self-checkout systems add 'on-line' efficiency", Discount Store News. New York: Jun. 8, 1998. vol. 37. Iss. 11: p. 70, 2 pgs.*

* cited by examiner

*Primary Examiner*—John W. Hayes
*Assistant Examiner*—Rutao Wu

(57) ABSTRACT

A produce identification and pricing system and method for a supermarket checkout or other retail outlet where produce is handled. The produce identification and pricing system and method determines produce type and grade. A price database contains price information based on produce type and grade. Price is calculated using the produce type and grade.

19 Claims, 4 Drawing Sheets

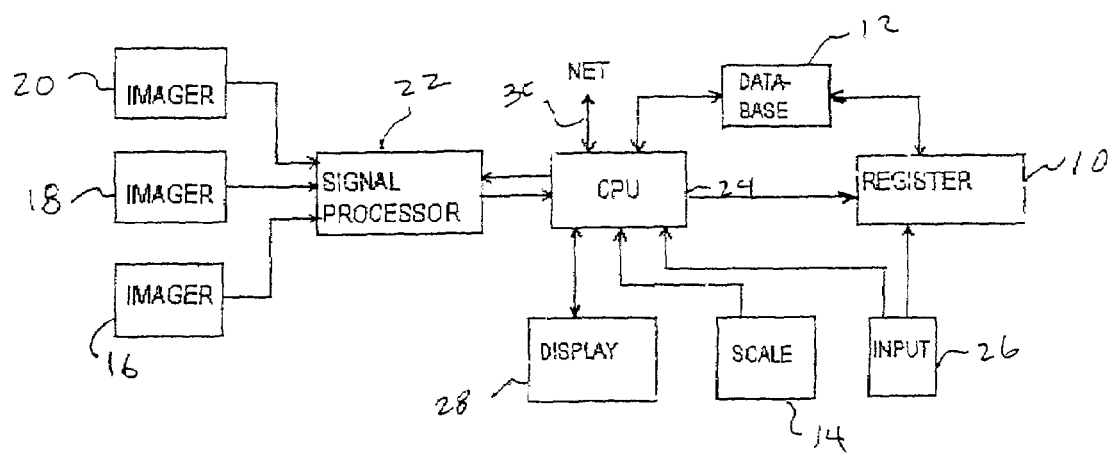
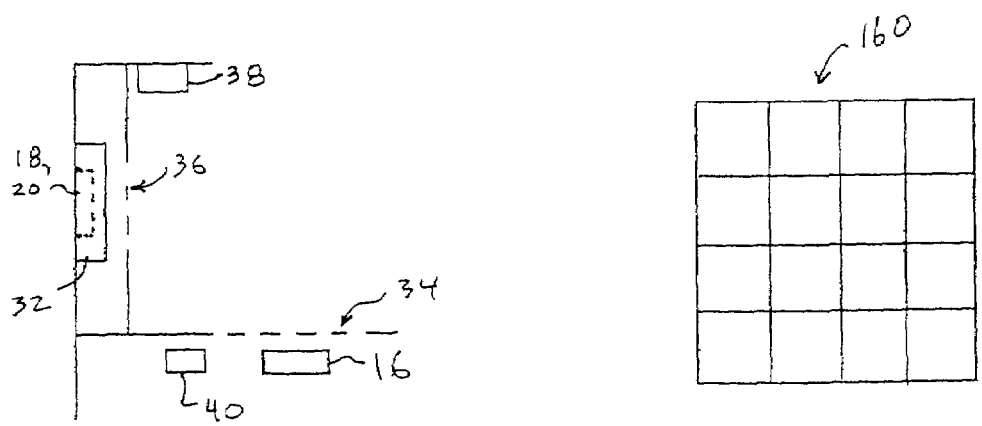
FIGURE 1
FIGURE 2
FIGURE 5

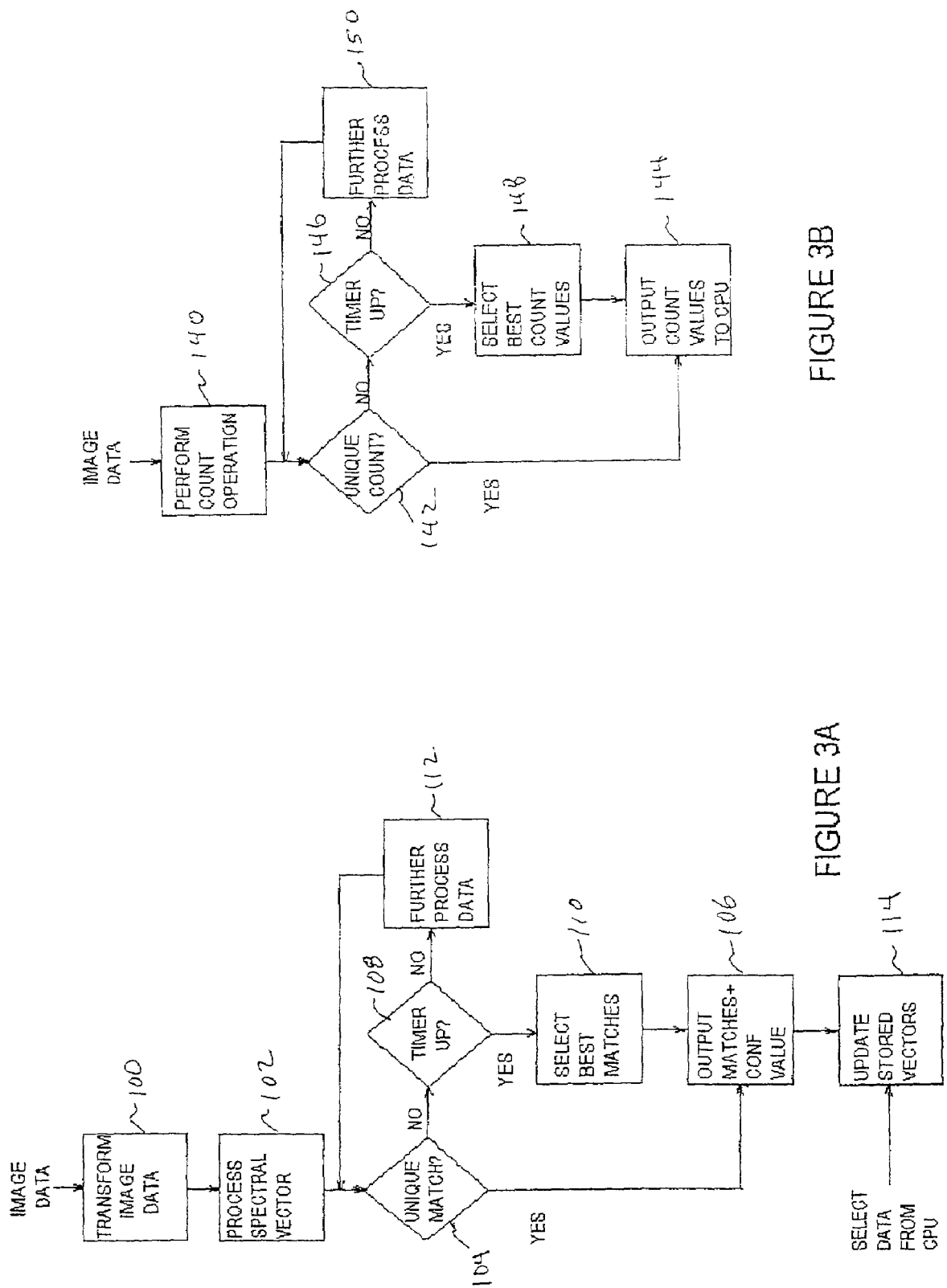

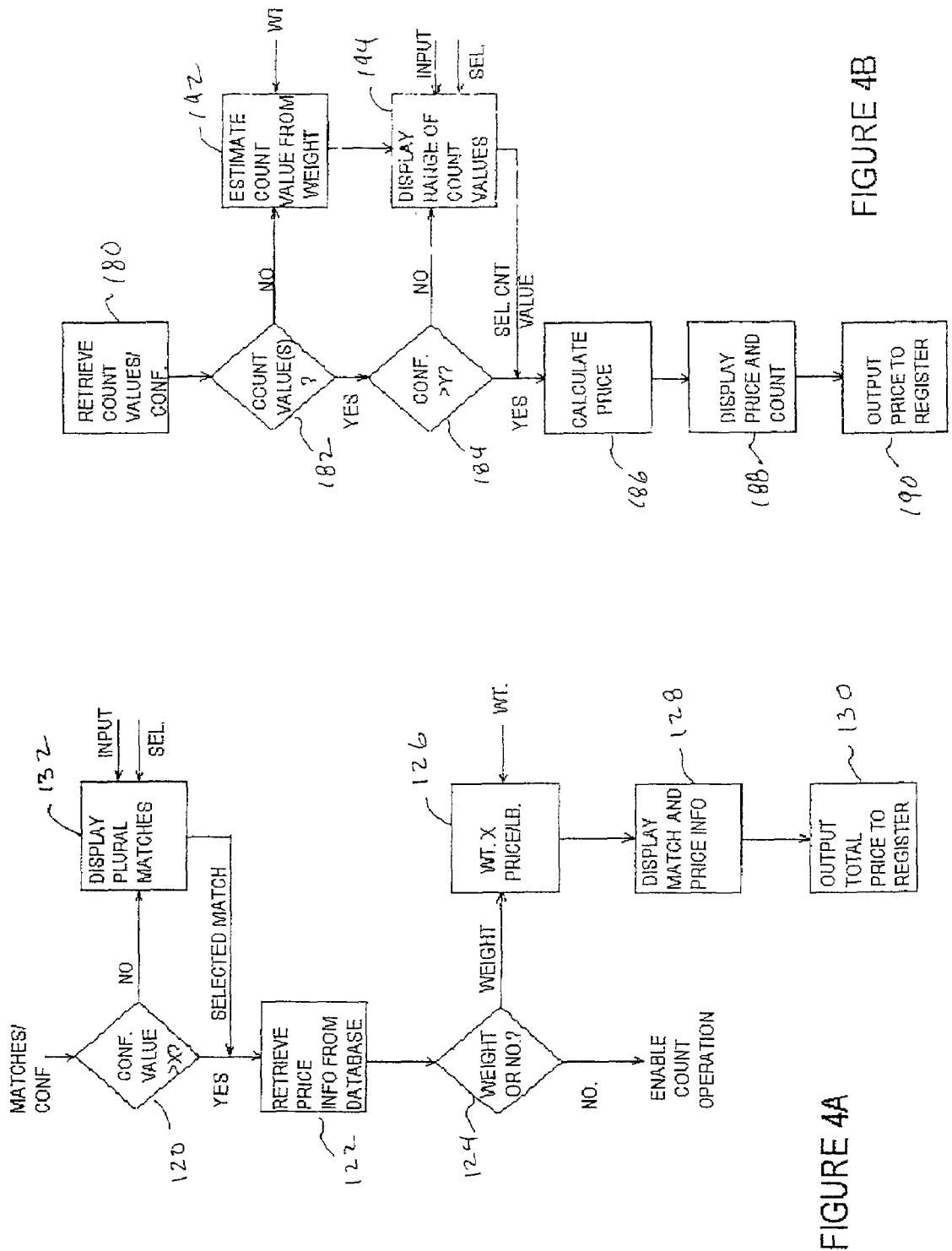

PRODUCE IDENTIFICATION AND PRICING SYSTEM FOR CHECKOUTS

RELATED APPLICATION INFORMATION

The present application is a continuation in part of Ser. No. 09/143,903 filed Aug. 31, 1998, now U.S. Pat. No. 6,363,366, the disclosure of which is incorporated by reference.

BACKGROUND OF THE INVENTION

1. Field of the Invention

The present invention relates to checkout systems such as employed for supermarkets and other retail outlets. The present invention further relates to pattern recognition systems and methods.

2. Description of the Prior Art and Related Information

Bar code scanning systems are ubiquitous in supermarket checkouts and other checkout systems in various retail outlets. This type of product identification and pricing for checkout systems is extremely effective and has revolutionized retail checkouts both in speed and accuracy. Bar code handling at retail checkouts has also enabled detailed inventory control. Nonetheless bar codes are not well-suited for certain types of articles and certain types of applications. Most notable of these applications where bar codes are not well-suited is the identification and pricing of produce, i.e., fruits, vegetables and other agricultural products, at supermarket checkouts. The handling of produce is not well suited to bar code systems since supermarket shoppers are typically free to purchase produce in varying quantities based on weight or number of items. Therefore, while some produce is prepackaged and bar coded the majority of produce is handled as loose collections of variable numbers of items.

To handle such variable collections of produce, checkout personnel must either memorize a lengthy list of prices or produce codes or consult printed tables. Both procedures are potentially prone to error and much slower than the handling of bar coded products. Therefore, produce handling at supermarket checkouts represents both a time bottleneck and a source of error in the handling of a high volume of supermarket checkout items. This time problem may require additional checkout aisles to be opened, and additional employees to be occupied at the checkouts, to provide a desired degree of throughput. Also, to reduce error the training involved in handling of produce at supermarket checkouts is greater than required for handling of bar coded products. Where a high turnaround of supermarket checkout personnel is experienced, this additional training can introduce higher employee costs and possible lost revenues.

Another apparently unrelated problem with supermarket handling of produce relates to customer preferential selection of produce, produce restocking and spoilage. Many types of produce quite quickly show signs of ripening which make them less desirable to customers than freshly stocked less ripened produce. Customers will select the less ripened produce preferentially over even slightly more ripened produce leaving the slightly more ripened produce on the shelf to ultimately spoil. Although the produce may not be restocked until most of the existing produce is gone, some unnecessary spoilage will inevitably result. Also, if this approach to the problem is adopted, the selection may be quite limited and of apparently poor quality just before the produce is restocked. This is obviously undesirable where produce quality and freshness is part of the marketing and competitiveness of a supermarket. Therefore, supermarkets are faced with the undesirable choice of either frequent restocking to maintain a fresh appearance to the produce but with spoilage and waste or less frequent restocking for less waste but a less fresh overall appearance. A similar problem exists for produce having slight bruises, imperfect shape, or other imperfections. Again customers will preferentially select the higher quality produce leaving the less perfect produce on the shelves to ultimately spoil. Again supermarkets can either accept the wastage and frequently restock for a high quality appearance or restock less frequently for less wastage but poorer appearance. This apparently inevitable trade off between waste and appearance of quality is clearly a highly undesirable situation for the handling of produce in supermarkets.

Therefore, it will be appreciated that a need presently exists for an improved approach to the handling of identification and pricing of produce at supermarkets.

SUMMARY OF THE INVENTION

The present invention provides a system and method for identification, pricing and inventory monitoring of produce at supermarket checkouts which addresses the above noted problems.

In a first aspect, the present invention provides a method for the automatic identification and pricing of produce at checkout. The method comprises receiving image data from the produce presented at the checkout, determining the produce type using the image data, and determining the produce grade using the image data. The method further comprises accessing a price information database and retrieving price information for the identified produce type and grade and computing the price of the produce based on the price information for the identified produce.

For example, determining the produce grade may comprise employing the image data to derive produce ripening information and using the ripening information to determine produce grade. Determining the produce grade may also, or alternatively, comprise employing the image data to derive produce bruising information and using the bruising information to determine produce grade. Other image characteristics may also be employed to determine produce grade. The price information database preferably comprises a plurality of price vs. grade profiles corresponding to different produce types. The plural profiles may comprise discrete tables or continuous price to grade curves.

In a further aspect the present invention provides a method for the automatic identification and pricing of produce presented at a checkout, comprising receiving image data from the produce presented at checkout, transforming the image data to a first signature vector characterizing the produce and comparing the first signature vector to stored signature vectors representing a target set of produce types and identifying the produce based on the best match with the stored signature vectors. The method further comprises transforming the image data to a second signature vector characterizing the produce, comparing the second signature vector to stored signature vectors representing a target set of produce grades and determining the produce grade on the best match with the stored signature vectors. The method further comprises accessing a price information database and retrieving price information for the identified produce type and grade and computing the price of the produce based on the price information for the identified produce.

Transforming the image data to a second signature vector may employ the identified produce type. Transforming the image data to a second signature vector may employ different image characteristics than said first signature vector. The price information database preferably comprises different price vs. grade profiles for different produce types. Accessing the price information database preferably comprises accessing the profile for the identified produce type and determining the price for the produce grade.

In a further aspect the present invention provides a produce identification and pricing system, comprising at least one imager for providing image data from produce to be identified. An image processor receives the image data and obtains a best match identification of the produce type and grade of the imaged produce. The system further comprises a database storing price information for the target produce types and grades and a register processor for calculating the total price of the produce based on the price information of the identified produce type and grade. The price database preferably comprises a plurality of price vs. grade profiles.

Various other novel features and advantages of the present invention are provided which will be appreciated from the following detailed description of the present invention.

BRIEF DESCRIPTION OF THE DRAWINGS

FIG. 1 is a block schematic drawing of a preferred embodiment of the present invention.

FIG. 2 is a cross-sectional schematic drawing illustrating the configuration of an imaging station in accordance with a preferred embodiment of the present invention.

FIGS. 3A and 3B are flow diagrams of a signal processing process implementing the produce identification and counting operations in accordance with a preferred embodiment of the present invention.

FIGS. 4A and 4B are flow diagrams of a CPU processing process implementing the pricing and inventory control operations in accordance with a preferred embodiment of the present invention.

FIG. 5 is a schematic drawing illustrating a reference pattern which may be provided on a transparent bag holding the produce being identified.

DETAILED DESCRIPTION OF THE INVENTION

Figure 6:
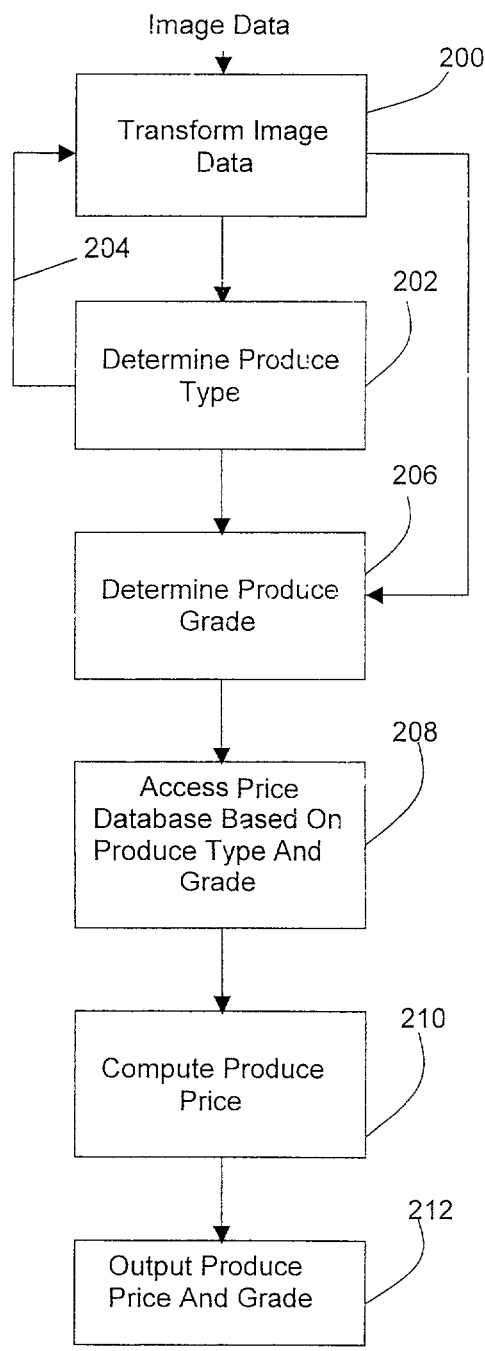
FIG. 6 is a flow diagram of an alternate embodiment of the present invention.

Referring to FIG. 1, a preferred embodiment of the present invention is illustrated in a block schematic drawing. The system of FIG. 1 is preferably implemented in a checkout counter at a supermarket or other retail outlet where agricultural produce is sold. Although the system of FIG. 1 includes the primary components of a complete checkout system, including a checkout register 10, a product inventory and price database 12, and a scale 14, a discussion of conventional aspects of these elements of the system will not be provided herein for brevity and the present discussion will focus on the new aspects provided by the present invention. Also, while a single checkout system is illustrated in FIG. 1 it should be appreciated that in a typical supermarket or other retail outlet a plurality of such systems will be provided which will preferably be networked together. Therefore, FIG. 1 should be viewed as including such a plurality of identical systems which are not shown for simple convenience of illustration.

Referring to FIG. 1, the system of the present invention includes at least one imager, with three imagers, 16, 18, and 20, being specifically illustrated. The imagers are preferably commercially available CCD or CMOS color imagers along with appropriate optics, i.e. at least a suitable lens system. For example, a variety of CCD imagers are available from Texas Instruments Inc., parts numbers TCXXX which provide a variety of resolutions and frame rates with corresponding trade-offs in price. A number of other sources for high-quality CCD imagers are also available. CMOS imagers are also available from several manufacturers at a variety of resolutions and frame rates. For example, Vision PLC of Edinburgh, Scotland has commercially available a series of CMOS imagers, parts numbers 5XXX and 6XXX having a variety of pixel resolutions and other characteristics. Motorola Inc. also has commercially available a series of CMOS imagers including the MCM series of imagers. In an embodiment of the present invention employing three imagers such as shown in FIG. 1, preferably two of the imagers comprise conventional imagers such as described above whereas the third imager comprises a spectrally enhanced imager; in particular, the spectrally enhanced imager may be an imager adapted to provide spectral information in the near infrared (NIR). For example, referring to FIG. 1, imagers 16, 18 could be conventional CMOS or CCD imagers configured to provide a three-dimensional image of the produce to be identified. The third imager 20 could in turn be an NIR enhanced imager, for example, such as described in U.S. Pat. No. 5,661,817 to Hatlestad et al. and U.S. Pat. No. 5,555,464 to Hatlestad, the disclosures of which are incorporated herein by reference. As noted, e.g., in the '817 patent, a conventional color CCD camera may be converted into a NIR selective camera by use of filters and this provides a relatively inexpensive method for obtaining such spectral information. A similar filtering approach may be employed for a conventional CMOS color camera to obtain an NIR enhanced CMOS camera. Another approach to obtaining distinct NIR information is described in U.S. Pat. No. 5,621,460 to Hatlestad et al., the disclosure of which is incorporated herein by reference. Alternatively, more expensive multi-spectral cameras may be employed for camera 20, for example, the multi-spectral cameras available from Sony Corp. or the IMC series of multi-spectral camera available from Xybion Corp. may be employed. As discussed in more detail in the '817 patent noted above, the information provided from the multi-spectral camera may also include ratios of spectral channels provided from the imager, to derive the NIR component.

Still referring to FIG. 1, the imager(s) provide the image data to a signal processor 22 which implements matching algorithms and optional counting algorithms on the image data as will be discussed in more detail below in relation to FIGS. 3A and 3B. Signal processor 22 may be a digital signal processor of a type commercially available and programmed to implement the operations to be described below. Signal processor 22 will include sufficient high speed memory to hold several frames of image data. Alternatively, the signal processor 22 may be a hardware or software implemented system optimized for vision systems applications. For example, the vision recognition system (VRS) available from BrainTech Inc. of North Vancouver, British Columbia, Canada is specifically adapted to implement user-defined pattern recognition algorithms and may be employed for signal processor 22. The VRS system from BrainTech includes, in addition to a module for implementing pattern matching algorithms, a data acquisition and digitization module and a preprocessing module. The data acquisition module receives the image data from multiple imagers and stores the data on a frame by frame basis. The preprocessing module in turn employs the image data to isolate basic shapes in the image from background and then transform the image data into signature vectors for pattern recognition. Such transformations adapted for the present application will be described below. These preprocessing functions may also be provided in a more conventional signal processing environment and some of these may be provided by the imagers themselves since some of the above noted imagers include signal processing capability which may provide speed advantages and/or cost advantages. After completion of the preprocessing operations the signal processor 22 performs the matching operations on the signature vectors and identifies the produce as described below.

As further shown in FIG. 1, signal processor 22 is coupled to a CPU 24 which receives produce identification information from signal processor 22 and optional count data, retrieves appropriate price information from database 12 and performs a total price computation as will be described in more detail below in relation to FIGS. 4A and 4B. If the operations of signal processor 22 are implemented as software on a general-purpose processor, the CPU 24 and signal processor 22 may be combined as a single processor. To allow total price computations for weight based produce the CPU 24 also receives a weight input from scale 14 as well as operator input where necessary from input 26. Input 26 may be a voice input in which case CPU 24 may also provide a voice recognition capability. Alternatively input 26 may be a simple push button input pad. Also, CPU 24 provides produce identification information, count values and total price information to a display 28. Display 28 may further comprise a touch screen type display which allows the operator of the checkout system to select from among plural displayed produce identification selections or plural displayed count values.

CPU 24 provides the total price information to register 10 and also provides the produce identification information which may be printed on the customer receipt along with the total price. The produce identification information may also be provided directly to database 12 for purposes of inventory monitoring or may be provided to database 12 via register 10. As also illustrated in FIG. 1, CPU 24 communicates information to signal processor 22, and in particular provides the correct produce identification when selections from plural possible matches is required by the operator or when the operator corrects an erroneous identification. This information is used to update the signature vectors for the produce matching operations in signal processor 22 and is part of a learning capability preferably implemented by signal processor 22. For example, the pattern matching processor employed by the VRS system of BrainTech Inc. described above has such a learning capability. When the signature vectors have been corrected and updated by signal processor 22 they are provided back to CPU 24 which outputs them to other systems in the network as indicated by line 30 in FIG. 1. Also, the CPU 24 receives similar corrected matching information from other systems coupled in the network as illustrated by the network input along line 30 in FIG. 1. It will be appreciated that when multiple systems are combined in a network the overall combination of systems will rapidly create optimal signature vectors for matching the produce due to the relatively large volume of produce going through the multiple stations. Also, a calibration station having a matching set of imagers and signal processor employing a matching algorithm may be used to image produce and input updated signature vectors as new shipments of produce are entered into the store.

It will further be appreciated that since checkout registers are commercially available which employ general-purpose processors therein, CPU 24 may be dispensed with as a separate stand-alone chip and its functions may be implemented in the CPU of register 10. For example, the NCR 7452 POS workstation manufactured by NCR Corp. of Dayton, Ohio is an example of such a register employing a general-purpose CPU which may suitably be employed for register 10.

Referring to FIG. 2, a cross-sectional line drawing of an imaging station in a checkout system incorporating the imagers described above in relation to FIG. 1 is illustrated. The produce to be imaged and identified moves in the direction normal to the drawing of FIG. 2 and is passed along typically by a conveyor to the edge of the imaging station shown and then by hand through the actual imaging location illustrated. In an embodiment employing at least two imagers to provide a three-dimensional image of the produce, one of the imagers, e.g. imager 16, will be positioned below the produce and the other imager(s), e.g. imagers 18 and/or 20, will be configured in a position to the side of the produce as generally indicated in FIG. 2. The side configured imagers 18,20 are illustrated in FIG. 2 as mounted on a printed circuit board 32 which may also optionally incorporate one or more of signal processor 22 or CPU 24. The bottom imager 16 will also need a support and electrical connections to the signal processor 22, which are not shown in FIG. 2 for convenience of illustration. Both the bottom and side configured imagers will preferably be configured behind transparent surfaces 34,36 respectively, with the transparent surface 34 actually supporting the produce as it is slid through the imaging area shown in FIG. 2. As is also shown in FIG. 2, the imaging station may employ light sources 38,40 which illuminate the top/side and bottom of the produce to be imaged, respectively. As will be discussed in more detail below the spectral information from the produce is an important identifying characteristic for the produce and therefore light sources 38,40 provide a consistent white light source to illuminate the produce. If consistent ambient lighting is available in the environment of the checkout system the light sources 38 and 40 may be dispensed with, however.

The system of the present invention preferably operates only for produce identification with other retail products being handled by bar code processing. A bar code reading system may therefore be combined in the imaging station illustrated in FIG. 2. In particular, a bar code reading laser source may be configured behind transparent surface 36 and/or below transparent surface 34. Also, there are commercially available bar code scanning systems which include side and bottom transparent panels for bar code scanning from both the side and bottom of the retail products. For example, the NCR 7875 scanner and scale has such a top and bottom bar code scanning configuration and may be employed in the overall checkout system of the present invention. Also, the NCR 7875 scanner has an integrated scale which may be employed for scale 14 in FIG. 1. It will therefore be appreciated that the imagers 16, 18 and 20 illustrated in FIG. 2 could be configured in such an existing bar code scanning system and not require any further obtrusive hardware in the checkout station. Also, the same imagers employed for the produce identification as illustrated in FIGS. 1 and 2 may image the bar codes, implementing standard bar code processing approaches, since produce and bar coded products will not be presented at the imaging station at the same time. Such a shared use of the imagers could provide cost advantages for such a combined produce imaging and bar code scanning system.

Referring to FIG. 3A, the process flow of the signal processor 22 of FIG. 1 is illustrated. It will be appreciated that, while the process flow is illustrated in FIG. 3A as a software flow diagram, the process steps may be implemented by software, hardware or a combination thereof with certain steps being implemented by dedicated hardware and other steps by software.

The process flow of the signal processor 22 commences with the receipt of the image data provided from the image processor(s) 16,18, and/or 20 as shown in FIG. 1. The image data provided from the imagers preferably has been analog to digital converted. Such imagers may also preprocess the data to isolate basic object boundaries and eliminate background information and noise if imagers incorporating high-speed digital signal processor chips are employed. High-speed DSP chips are associated with several of the imagers commercially available from the above noted manufacturers of imagers. Alternatively such analog to digital conversion and preprocessing may be performed by signal processor 22 which performs such preprocessing before the initial step 100 illustrated in FIG. 3A. Where multiple imagers are employed, signal processor 22 will also combine the image data from plural imagers into a single set of image data. The background removal step will preferably include removal of any features such as glare due to the produce being wrapped in a plastic bag or similar plastic wrapping. Straight line edges of a package other than a plastic bag may be detected as not corresponding to a natural item of produce and serve to indicate a partial object so as to be accommodated in the subsequent processing for object identification. Typically, however, prepackaged produce is also bar coded so normally the only packaging requiring background compensation will be a transparent plastic bag or similar transparent wrapping. The background removal processing may also involve removal of reflected light from the bar code scanning laser if the produce identification system is combined at the same imaging location as a bar code scanner. Since such a laser reflection will have a very strong signature it will be relatively easy to identify and remove from the image data processed. As will be discussed below, however, such reflected laser light may also be advantageously exploited to obtain additional identification characteristics for the imaged produce.

As shown in FIG. 3A, at step 100 the preprocessed image data is transformed into specific characteristics or signatures which are used to identify the produce by comparison to stored target signatures for each of the target produce types. These signatures may be handled mathematically as vectors to facilitate pattern matching algorithms and therefore may be referred to herein as signature vectors. The transformation of the image data into signature vectors will include at least identification of spectral information from the image data and transformation into a spectral vector (i.e., a signature vector incorporating spectral information). If only a simple color imager is used the spectral information will preferably correspond to a RGB histogram. If a spectrally enhanced imager such as described above is employed, additional spectral channels will be provided and employed for the creation of the spectral signature. For example, as described above NIR spectral information may be obtained and combined with the RGB information to create a more robust spectral signature of the imaged produce. Also, ratios of the intensity in various spectral bands may be employed, e.g., ratios of the infrared to one or more of the RGB channels.

In obtaining a spectral signature for the imaged produce it is important that spectral information from areas of the produce which are not representative of the produce for identification purposes be rejected. In particular, a variety of produce is susceptible to bruising which can create discolorations on the surface of the produce which have spectral characteristics which are not representative of the produce generally. Such bruised areas should therefore be eliminated from the spectral information being used to identify the produce. A variety of methods may be employed to eliminate the spectral information from bruises or to reduce their significance in the matching operation. For example, methods for detecting bruises in produce such as fruit have been developed for different purposes but nonetheless may be suitably employed for the purposes of the present invention. For example, NIR information has been employed to detect bruises in various types of fruit as described in U.S. Pat. No. 3,867,041 to Brown et al., the disclosure of which is incorporated herein by reference. An alternative approach to detection of bruises is described in U.S. Pat. No. 4,741,042 to Throop et al., the disclosure of which is incorporated herein by reference. Alternatively, spectral information may be taken from a number of sample segments of the object to be identified and any information from segments which differs substantially from the mean is rejected. Once any bruised areas are removed the spectral information may transformed to a signature vector.

Also, the transformation of the image data to spectral signatures can accommodate differences in spectral signatures from fruit or other produce due to differences in the degree of ripening involved. As is well-known various fruits and vegetables can change substantially in spectral characteristics, including color and NIR characteristics, as they ripen. The degree of such ripening may vary substantially between shipments of produce and may occur during the time the produce sits on the shelves at the supermarket. For example, bananas, tomatoes and other fruits and vegetables are often placed on the supermarket shelves in a slightly unripened state and allowed to remain on the shelves while they ripen. Shipment variations in ripening may be accommodated by initial calibration of the recognition system for each new shipment. On the shelf ripening in turn may be accommodated in the spectral signature matching process by storing several different spectral signatures for a given target type of produce corresponding to the different stages of ripening.

A potential problem in the transformation of the image data into an accurate spectral signature may be perceived since the spectral characteristics of the produce may vary, due to varying degrees of ripening, over its surface. This unevenness may actually be employed to enhance recognition accuracy, however, since the spectral vector may include several spectral samples from several segments of the produce having differing degrees of ripening. The range of spectral characteristics will correspond to the produce's specific ripening characteristics and will serve to characterize the produce to be identified. For example, an RGB signature vector including a strong green component at one segment and a strong red component at another segment could serve to characterize a partially ripened tomato whereas a strong green combined with a strong yellow at a different segment could serve to characterize a partly ripened banana.

Such multi-segment spectral vectors, i.e., spectral vectors including spectral information from different areas or segments of the produce, may also serve to characterize produce having strongly varying spectral characteristics at different portions of the produce. For example, the combination of the spectral characteristics of a fruit body and the different spectral characteristics for the fruit stem may uniquely characterize a fruit having otherwise similar spectral characteristics with another fruit. The stored target signatures may therefore include such multi-segment spectral information.

As mentioned above, the produce imaging system of the present invention may also be combined with a bar code scanning system at the same imaging station. In such an embodiment reflected laser light from the bar code scanning laser may be exploited to obtain additional spectral information from the imaged produce. More specifically, the laser will illuminate the produce with a very specific wavelength of light which will be easily identified in the image data by its intensity. Also, only relatively few pixels of the image will receive this intense wavelength specific reflection. Therefore this information can be extracted from the image data without impacting on the spectral information from the balance of the pixels, effectively providing an additional channel of spectral information.

Still referring to FIG. 3A, at step 102 the signal processor 22 processes the spectral vector of the produce by matching the spectral vector, transformed from the image data at step 100, with the stored target spectral vectors of the target produce type database. This spectral matching operation can be done at high-speed, relative to two-dimensional or three-dimensional image matching algorithms, since the spectral signature may be a very simple vector. This spectral matching operation at step 102 also preferably includes the calculation of a confidence value for the match based on the closeness of the match between the spectral vector and the target vector as compared to the next best matches. At step 104 the confidence value of the match is compared with a reference confidence value to determine whether the match may be considered unique or not. If the determination at step 104 is that the match is unique then the match, i.e. the identified produce, is output to the CPU 24 at step 106. The confidence value associated with the match is also preferably output to the CPU. Optionally, even if a high confidence value is provided for the match the next nearest potential matches may also be provided at step 106 to the CPU to allow the CPU to optionally display the alternate matches based on user selectable criteria.

If the determination at step 104 is that the confidence value of the match is not sufficiently great to consider the match unique, at step 108 the status of a timer is checked. The timer is initiated when the produce enters the imaging station and a fixed period of time is given for the produce to be identified, e.g., 0.5 seconds. If the determination at step 108 is that the time has elapsed then the process proceeds to step 110 and selects the best matches to output to the CPU. The selection of the matches to output is based on the confidence value for the respective matches. The maximum number of matches to be output may be user selectable; for example, 2-10 matches may be selected by the user. When the best matches have been selected they are then output to the CPU at step 106 in the order of their confidence value along with, optionally, their confidence value. Although the timer checking step 108 is illustrated as a branch in the process flow, the elapsed time check may be implemented as a high priority interrupt in either a hardware or software implementation of the process flow of FIG. 3A.

If the determination at step 108 is that the time is not up, the processing of the transformed image data proceeds at step 112 using additional characteristics of the imaged produce. This further processing of the transformed image data will preferably include characteristics of the object beyond the spectral information, for example, based on the two or three dimensional characteristics of the object. This further processing of the image data at step 112 will therefore involve additional transformations of the image data at step 100. For example, the image data may be transformed to a signature based on two dimensional information including the ratio of the maximum to the minimum dimension of the object (i.e., the ratio of the length to the width of the object), the rough contour of the object (e.g. measured by the maximum positive and negative deviations from a best fit ellipse), the fine contour of the object (e.g. measured by a histogram of measurements of deviation from a best fit ellipse) and/or the estimated area of the object. A more complex signature could be generated using three-dimensional information, generally corresponding to the above 2D information, e.g., including a ratio of length to width to depth, 3D contour information based on a measure of deviations from a best fit ellipsoid, volume, etc. More complex signatures may also be obtained using only two-dimensional image data, for example, texture information may be obtained through additional processing of the image data at step 100. Such texture information may be obtained using a wavelet transform of the image data. Also, if the imaging system is implemented in conjunction with a bar code scanner having a laser source, reflected laser light may also provide texture information by detecting the speckle pattern reflected from the object.

Preferably, the step of processing the image data using more complex signatures at step 112 proceeds with a truncated database of target signatures. More specifically, the initial spectral signature matching operation at step 102 may be used to truncate the possible target signatures dramatically even if a unique match is not made. In this way the processing of the more complex signatures at step 112 may proceed far more rapidly than if the full target database of signatures needed to be processed.

The step of further processing the image data at step 112 may be implemented in stages as represented by the closed loop in the process flow of FIG. 3A. That is, several different levels of complexity of the signatures may be provided with each next step of processing at step 112 including a more complex set of signatures until the unique match is found or the timer step 108 terminates the processing. In this way the likelihood of a unique match or a very small set of potential matches will be maximized for a given period of time. For example, after processing the spectral information the processing may next proceed with relatively straightforward signatures from the two-dimensional images, such as those noted above. If this 2D derived signature is also unsuccessful in finding a unique match, it may be followed by processing of texture information, or by processing of three-dimensional related signatures.

Although the processing of the image data is thus illustrated in terms of sequentially and separately processing progressively more complicated signatures to expedite the determination of a unique match, it will be appreciated that this approach may be varied, depending upon the particular implementation of the system. For example, one of the reasons for processing the spectral signature vector before including the additional signature information from the objects two or three dimensional shape is that the transformation of the shape data to a useful signature may take longer than for the spectral signature. Therefore, step 100 may delay the matching operation at step 102 and delay a possible rapid match based on a spectral signature. However, it will be appreciated that in some implementations the transformation of the image data to signature vectors may be performed in hardware whereas the image matching operations are performed in software on a general purpose CPU. The image data transformations may therefore be very rapid relative to the matching computations. In such implementations it may be advantageous to proceed with the transformation of the image data to a signature including more complex shape derived information before proceeding with the matching operation. Then the matching algorithm will be free to employ the signature in the most efficient manner to derive a match. For example, as noted about several of the commercially available imagers may be provided with digital signal processors. These can be programmed to rapidly provide transformations of the image data to signatures including two-dimensional or even three-dimensional shape derived characteristics in addition to the spectral information. Therefore, if the subsequent matching operations are performed on a general-purpose CPU it will be more efficient to provide a more detailed signature for the object before commencing the matching operation.

Also, it may be advantageous to implement in parallel the transformation of image data to signatures or the processing of the particular signature(s) so derived. For example, in such an approach the spectral signature may be processed in parallel with the shape derived signatures and texture signatures to derive plural subsets of the target set, which subsets are then compared to make an ultimate unique match. Furthermore, in some instances it may be advantageous to do preliminary shape based processing of the image data prior to a spectral signature analysis. For example, where the initial spectral analysis provides ambiguous information, for example, due to a highly blemished object, it may be advantageous to initially eliminate a number of potential targets using shape derived signatures and then eliminate the resulting subset using the spectral signature. Also, as noted above spectral information may be derived from plural characteristic locations of the produce, e.g., the body and stem regions of a fruit, for comparison with stored target signatures with characteristic spectral information for specific plural locations of the target produce. Preliminary shape may be advantageous in such approach to ensure the matching locations are compared. Therefore, it will be appreciated that the specific flow in FIG. 3A is merely illustrative since the transformation and matching operations may be modified in a variety of ways to optimize the speed of recognition and to best utilize a particular configuration of hardware and software.

Referring to FIG. 4A the process flow of the CPU 24 is illustrated. As discussed above, signal processor 22 outputs the best match(es) and confidence value for the match(es) to the CPU 24 at step 106 and this is represented by the input of this information at the top of the process flow of FIG. 4A. At step 120 the CPU determines whether the confidence value of the best match from the signal processor 22 exceeds a preset confidence value X. If the determination at step 120 is that the confidence value of the match is adequate then the CPU process flow proceeds to step 122 and the CPU retrieves the price information for the identified produce type from database 12 (referring to FIG. 1). At step 124 the CPU determines whether the price for the identified produce type is based on weight or number of items. If the price is based on the weight than the CPU proceeds to step 126 to retrieve the weight from scale 14 (shown in FIG. 1), and calculates the total price by multiplying the weight times the price per pound. At step 128 the total price and identified produce type is displayed on display 28 (shown in FIG. 1). Preferably at the same time an audible indication of a positive match is made, similar to the audible indications typically generated by bar code scanning systems. For example, a single beep may indicate a positive match to the operator of the checkout. Then at step 130 the CPU outputs the total price and produce type to the register 10 (shown in FIG. 1), which adds the price to the shopper's total bill. At the same time the CPU may update the inventory in database 12 to reflect the sale of a given weight of produce of the identified type, or this information may be provided to the database via register 10. On the other hand, if the determination at step 124 is that the total prices is based on the number of items, then the CPU 24 proceeds to enable a counting operation for the signal processor 22. This counting operation is illustrated in FIG. 3B which will be discussed below.

Referring again to step 120 illustrated in FIG. 4A, if the determination is that the confidence value of the match is not adequate then the process branches to step 132 where the CPU 24 displays the selected number of potential matches on the display 28 (shown in FIG. 1). At the same time, preferably an audible indication is given that a definite match has not been made and operator input is needed. For example, a double beep may be sounded to call the attention of the checkout operator or customer to the displayed possible matches. If the display 28 is a touch screen display, then the operator need simply touch the appropriate portion of the screen to select the correct match from the plural matches displayed. On the other hand, if a touch screen display is not employed each potential match will preferably be displayed along with a number and the operator need simply select the appropriate number using input 26 shown in FIG. 1. In the event that none of the displayed matches are correct the operator may then input the name or code for the correct match using input 26. If input 26 is a voice input then merely speaking the name of the correct produce will allow voice recognition software running in CPU 24 to identify and output the correct produce type as the selected match. In either case, the process flow proceeds from step 132 with the selected match as indicated to step 122 as in the previous discussion.

The correct selected match is also provided to the signal processor 22 so that the signal processor can update the stored signature vectors for the produce and learn from the operator input. This correction of stored signature vectors is illustrated at step 114 in FIG. 3A. In this regard, as noted above the processor 22 may employ the VRS pattern recognition system provided by BrainTech Inc. and this system includes a capability for improving recognition through a learning process by employing neural network and fuzzy logic algorithms in the VRS system. Also, preferably the selection information and the updated signature vectors are provided to other systems in the network as illustrated by connection 30 in FIG. 1 to allow the multiple checkout stations to share correct identification information and more rapidly learn the best signature vectors for the produce in the store. This allows the overall system including the multiple checkout stations to rapidly respond to changes in characteristics of the produce as new shipments arrive in the store.

Referring to FIG. 3B, the count operation process flow performed by the signal processor 22 is illustrated. As noted above, if the CPU determines that the total price of the identified produce is based on the number of items it instructs the signal processor 22 to perform a count operation. The count operation illustrated at step 140 in FIG. 3B preferably employs three dimensional characteristics of the imaged objects. Such three-dimensional information may be derived from image data from two different imagers configured at different positions relative to the produce to be imaged as described above in relation to FIG. 2. Also, the three-dimensional characteristics needed to count the number of items may be derived by comparing the image data from different frames as the produce is moved into the imaging area, the different frames providing different angles of reference as the produce moves. Furthermore, a reference pattern may be employed to detect three-dimensional characteristics of the imaged objects as described in U.S. Pat. No. 5,561,526 to Huber et al. the disclosure of which is incorporated herein by reference. As described in the 526 patent the reference pattern may be projected on the object and means for providing such a reference pattern may be provided in the light sources 38 and 40 described above in relation to FIG. 2. Alternatively, a reference pattern may be printed on the transparent plastic bags available in the supermarket. FIG. 5 represents an exemplary reference pattern 160 on the sides of a plastic bag of the type typically dispensed in a supermarket. Such a reference pattern, whether projected or present in a transparent bag holding the produce, also facilitates the derivation of size and shape characteristics for use in the transformation to signature vectors in the original matching operation described above in relation to FIG. 3A.

Still referring to FIG. 3B, at step 142 the signal processor compares the confidence value of the count operation to a preset threshold value. If the confidence value exceeds the threshold it is determined that a unique count value has been arrived at and the process flow proceeds to step 144 where the count value is output to the CPU 24. If the determination at step 142 is that the threshold value exceeds the confidence value then the flow proceeds to step 146 where the status of a timer is evaluated. If the determination at step 146 is that the time allotted for the count operation has elapsed, the process proceeds to step 148 where the best guess count values are determined and then output to the CPU at step 144. If the determination at step 146 is that the fixed time has not elapsed the process flow continues at step 150 to further process the image data, for example, by obtaining more complex three-dimensional representations of the collection of objects, to continue to attempt to count the number of objects to the desired degree of confidence. It will be appreciated, however, that both steps 146 and 150 may comprise a high priority interrupt terminating the loop illustrated between steps 142, 146 and 150 if the time has elapsed or if it is determined that no further processing of the data is possible.

Referring to FIG. 4B, the handling of the count information by the CPU 24 is illustrated. As shown, at step 180 the CPU receives the count values and optionally a confidence value from the signal processor 22. At step 182 it is determined whether or not the signal processor has been able to determine a count value for the collection of objects. If a count value has been determined the process flow continues at step 184 to determine if the confidence value of the count value exceeds a threshold value Y corresponding to a unique count. If the determination at step 184 is yes the CPU process flow proceeds at step 186 to calculate the total price for the collection of produce. At step 188 the price information is displayed along with the identified produce type and the count value. At the same time preferably an audible indication of the identification and price is provided, for example, a single beep such as is typically employed in bar code scanners to indicate identification of a bar coded item and price. At step 190 the price, identification and count information is output to the register and database as discussed previously in relation to step 130.

Still referring to FIG. 4B, if the determination at step 182 is that the signal processor has been unable to compute the total number of items then the process branches to step 192 and the CPU estimates a range of count values based on the weight of the collection of items provided from scale 14 and a nominal per item weight value, which may be retrieved from database 12. Since this estimated count value will be relatively inaccurate a range of values on either side of the estimated value is displayed at step 194. At the same time an audible indication is preferably provided, for example a double beep, to indicate the need for an operator input. If the correct count value is one of the values displayed the operator may simply select the correct value using input 26, shown in FIG. 1, or display 28 if a touch screen display is employed. If the correct count value is not displayed the correct value may be input using input 26, via either a touch or voice input. The selected count value based on the operator input is output at step 186 and the process flow proceeds as described above. Similarly, if at step 184 it is determined that the count value derived by the signal processor is not sufficiently reliable, the process flow branches to step 194 where a range of values on either side of the count value provided by the signal processor is displayed. Once again, the operator is called by an audible indication to input the correct value using input 26 or display 28 and the count value is selected by the operator and output as described above. The correct count value may also be provided to the signal processor to allow the signal processor to update its count algorithms to learn from the correction input by the operator. The corrected algorithms in turn may preferably be shared with other systems on the network as indicated by network connection 30 in FIG. 1.

Referring to FIGS. 1 and 6, a further embodiment of the present invention which addresses the problem of produce spoilage and waste will next be described. As discussed above, this problem arises due to preferential selection of produce by customers such that produce with imperfections or slightly over ripened produce is left on the shelves to spoil. The present invention provides dynamic produce pricing based on produce quality to give customers an incentive to pick out less perfect produce at reduced cost rather than leaving such produce on the shelves to spoil. Furthermore, different price to quality profiles may be provided to maximize the desired produce turn over. Also, the price to quality profile may be varied for different produce types and different quality criteria may be employed for different produce types.

More specifically, referring to FIG. 6 the process flow of signal processor 22 of FIG. 1 is illustrated. The produce image data obtained at the checkout, for example, by image processors 16, 18 and/or 20 as discussed above, is provided to the signal processor 22 and processed at 200 into suitable signature vectors for produce identification and grading. Since grading is provided in addition to produce identification additional image characteristics may be employed beyond those needed for identification. Also, two separate sets of signatures may be provided, one optimized for identification and one optimized for grading. For example, bruises may be detected as discussed above and eliminated from color averaging for an identification signature but included in a grading signature. This bruising information for a grading signature may include size, color and number of bruises or ratio of bruised area to nonbruised area, for example. Also, as discussed above ripening information may be determined from the color variation at different locations on the produce and used for the identification signature and this may also be used for a grading signature. Similarly, shape information may be obtained and used for both identification and grading.

At 202 the identification signature vector is employed to determine the product type, as has been discussed previously. As in the previous embodiments, if the type cannot be determined to a desired confidence a display of possible types may be provided for selection by the checkout clerk. Once the produce type has been determined this information may be used to further refine the grading signature as indicated at 204. This refinement of the grading signature may be obtained from the image data at 200 or from an initial grading signature vector. Alternatively, the produce type may be employed in the grading process by adjusting the weighting in the signature matching during the grading processing 206. This choice will be made based on the particular algorithm and speed of the image processor to minimize delay in obtaining both the produce type and grade.

At 206 the grading processing employs the grading signature vector and produce type to determine produce grade. Each produce type will typically have a different grading pattern and this may be stored in local memory in image processor 22 or in database 12 as a table of grading vectors for each produce type. This table may weight different factors such as degree of ripening, degree of bruising, shape, size, overall color differently for each produce type. The grading signature for the imaged produce is compared to the table of grading vectors for the produce type to determine the best match grading score for the imaged produce. The grading score may be a continuous grading score or a discrete grade. Where the imaged produce is a number of separate items the grading score may be an average for the set of produce or an individual score for each item may be provided.

Figure 7A:
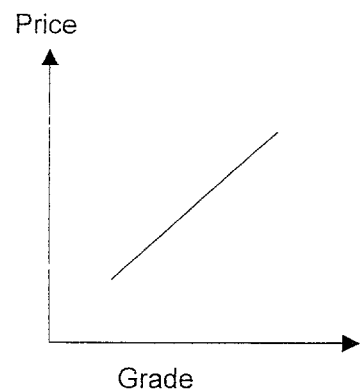
FIGS. 7A and 7B are diagrams of examples of price vs grade profiles employed in the embodiment of FIG. 6.
Figure 7B:
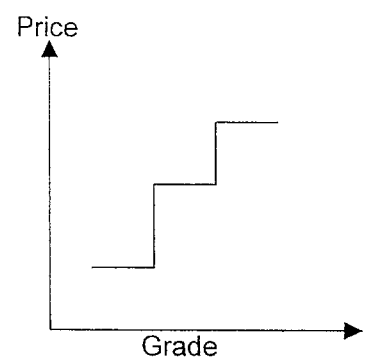

At 208 the grading score and the produce type are used to access the price database 12. If the grade is continuous the price database may comprise a continuous price/grade profile for each produce type. Examples of such profiles are provided in FIGS. 7A and 7B. As illustrated the profile may be a smooth curve or a stepped profile. For discrete grading the price/grade profile may comprise a table of process vs. grade. The choice of profile will be chosen to achieve the desired customer response and may be varied from store or over time as customer response and may be varied from store to store or over time as customer response is evaluated or in response to price competition or other market factors. Therefore, price profiles are preferably dynamic in nature and database 12 may be modified accordingly.

At 210 the price is computed using the price from the database for the produce type and grade. As discussed above, price may be computed based on weight or count and such information is provided from a scale or a count operation as an additional input to the processing at 210.

At 212 the price is output to the register 10. Preferably the grade is also output, optionally along with the saving to the customer, to reinforce the benefit to the customer of the grade based price processing.

Additional features may also be provided exploiting the grade based pricing capability. For example, if a grading processing at a checkout detects a grade below a minimum acceptable threshold level a warning may be issued to the checkout clerk or to a produce supervisor through a local network connection. This allows consistent produce quality to be maintained, e.g., from store to store in a large chain of supermarkets, without constant monitoring. Also, chain wide changes in produce pricing, e.g., for a special promotion, can be made simply transferring pricing database changes to the various stores.

Another feature which may be provided is a local grading location at the produce section with a camera and an imaging processor matching those at the checkouts. This allows the customer to check the produce grade and price before selecting the produce.

While the foregoing is a description of the presently preferred embodiment of the present invention it will be appreciated by those skilled in the art that a variety of modifications are possible while remaining within the spirit and scope of the present invention. Therefore, the foregoing should not be considered as limiting in nature but merely illustrative of one possible implementation of the present invention.

What is claimed is:

1. A method for the automatic identification and pricing of produce at checkout, comprising:
   receiving image data from the produce presented at the checkout;
   determining the produce type using the image data;
   determining the produce grade using the image data;
   accessing a price information database and retrieving price information for the identified produce type and grade, wherein said price information database comprises a plurality of price vs. grade profiles corresponding to different produce types;
   computing the price of the produce based on the price information for the identified produce; and
   outputting the price.

2. A method for identification and pricing of produce as set out in claim 1, further comprising determining if the identified produce price is based on weight and retrieving the weight of the produce from a scale if the price is based on weight.

3. A method for identification and pricing of produce as set out in claim 1, wherein said determining the produce grade comprises employing the image data to derive produce ripening information and using the ripening information to determine produce grade.

4. A method for identification and pricing of produce as set out in claim 1, wherein said determining the produce grade comprises employing the image data to derive produce bruising information and using the bruising information to determine produce grade.

5. A method for identification and pricing of produce as set out in claim 1, wherein said plural profiles comprise discrete tables.

6. A method for identification and pricing of produce as set out in claim 1, wherein said plural profiles comprise continuous price to grade curves.

7. A method for the automatic identification and pricing of produce presented at a checkout, comprising:
   receiving image data from the produce presented at checkout;
   transforming the image data to a first signature vector characterizing the produce;
   comparing the first signature vector to stored signature vectors representing a target set of produce types and identifying the produce based on the best match with the stored signature vectors;

transforming the image data to a second signature vector characterizing the produce;

comparing the second signature vector to stored signature vectors representing a target set of produce grades and determining the produce grade on the best match with the stored signature vectors;

accessing a price information database and retrieving price information for the identified produce type and grade;

computing the price of the produce based on the price information for the identified produce; and outputting the price.

8. A method for identification and pricing of produce as set out in claim 7, wherein transforming the image data to a second signature vector comprises employing the identified produce type.

9. A method for identification and pricing of produce as set out in claim 7, wherein transforming the image data to a second signature vector comprises employing different image characteristics than said first signature vector.

10. A method for identification and pricing of produce as set out in claim 7, wherein said price information database comprises different price vs. grade profiles for different produce types.

11. A method for identification and pricing of produce as set out in claim 10, wherein said accessing the price information database comprises accessing the profile for the identified produce type and determining the price for the produce grade.

12. A method for identification and pricing of produce as set out in claim 7, further comprising displaying the produce grade.

13. A produce identification and pricing system, comprising:

at least one imager for providing image data from produce to be identified;

an image processor for receiving the image data and obtaining a best match identification of the produce type and grade of the imaged produce;

a database storing price information for the target produce types and grades, wherein said database comprises a plurality of price vs. grade profiles; and a register processor for calculating the total price of the produce based on the price information of the identified produce type and grade and outputting the price.

14. A method for the automatic identification and pricing of produce as set out in claim 1, wherein outputting the price comprises displaying the price.

15. A method for the automatic identification and pricing of produce as set out in claim 1, further comprising adding the price to the total checkout bill.

16. A method for the automatic identification and pricing of produce as set out in claim 7, wherein outputting the price comprises displaying the price.

17. A method for the automatic identification and pricing of produce as set out in claim 7, further comprising adding the price to the total checkout bill.

18. A produce identification and pricing system as set out in claim 13, further comprising a display and wherein outputting the price comprises displaying the price.

19. A produce identification and pricing system as set out in claim 13, wherein said register processor adds the price to the total checkout bill.

* * * * *